United States Patent [19]

Najer et al.

[11] 3,835,159

[45] Sept. 10, 1974

[54] DERIVATIVES OF DIBENZODIOXEPINE

[75] Inventors: Henry Najer; Jean-Francois Giudicelli, both of Paris, France

[73] Assignee: Synthelabo, Paris, France

[22] Filed: July 21, 1972

[21] Appl. No.: 274,049

[30] Foreign Application Priority Data
July 23, 1971 France .............................. 71.26967

[52] U.S. Cl. .............................. 260/340.3, 424/278
[51] Int. Cl. ............................................. C07d 17/00
[58] Field of Search ................................. 260/340.3

[56] References Cited
UNITED STATES PATENTS
3,553,234  1/1971  Johnson et al. ................. 260/340.3

OTHER PUBLICATIONS
Thomson, "Chemical Abstracts," Vol. 75, 1971, Col. 48156f.
Breslow, et al., "Journ. Amer. Chem. Soc." Vol. 85, (1963), pp. 431–34.

Primary Examiner—Donald G. Daus
Assistant Examiner—James H. Turnipseed
Attorney, Agent, or Firm—Armstrong, Nikaido & Wegner

[57] ABSTRACT

The acids of the formula:

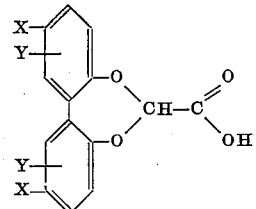

in which X is halogen, trihaloalkyl, or thiotrihaloalkyl and Y is hydrogen, halogen, trihaloalkyl, or thiotrihaloalkyl, and their salts and esters are useful in reducing the lipid content of the blood.

6 Claims, No Drawings

DERIVATIVES OF DIBENZODIOXEPINE

The present invention provides the dibenzo[d,f]-dioxepines-[1,3] of the formula

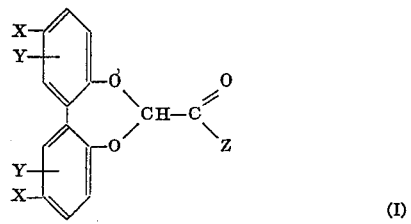

in which X is a halogen atom, preferably a chlorine atom, a trihalo-alkyl radical, preferably a trifluoromethyl radical, or a thiotrihalo-alkyl radical, preferably a thiotrifluoromethyl radical; Y is a hydrogen atom, a halogen atom, preferably a chlorine atom, a trihalo-alkyl radical, preferably a trifluoromethyl radical, or a thiotrihalo-alkyl radical, preferably a thiotrifluoromethyl radical, Y being in any free position in the phenyl nuclei; and Z represents -OM, in which M is a hydrogen atom or an alkali metal atom such as, for example, sodium or potassium; -OR, in which R is a straight or branched alkyl radical of one to four carbon atoms or a cycloalkyl or cycloalkyl-alkyl radical; an amino group of the formula:

in which $R_1$ and $R_2$ are identical or different alkyl radicals of one to six carbon atoms each of which can be connected to one another either directly or via one or more hetero-atoms to form a heterocyclic structure with the adjacent nitrogen atom; an alkoxy-alkoxy group of the formula:

-O-(CH$_2$)$_n$-O-R$_3$ (III)

in which $n$ is an integer from 1 to 4 and $R_3$ is a straight or branched alkyl radical of one to six carbon atoms; an aminoalkoxy radical of the formula:

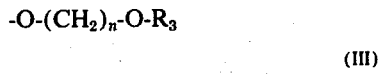

in which $R_1$, $R_2$ and n are as hereinbefore defined; an amino-alkoxy radical of the formula:

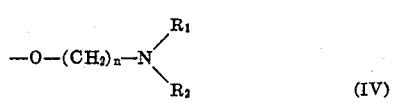

in which $m$ is an integer from 0 to 4, $m'$ is 4 or 5, and $R_4$ is an alkyl radical of one to four carbon atoms, the radical -O-(CH$_2$)$_m$- being attached at any position in the nitrogen-containing ring; an amino-alkoxy-alkoxy radical of the formula:

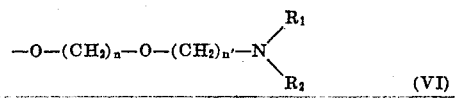

in which $R_1$, $R_2$ and $n$ are as hereinbefore defined and $n'$ has the same meaning as $n$, it being understood, however, that $n$ and $n'$ can be identical or different; an amino-alkylamino radical of the formula:

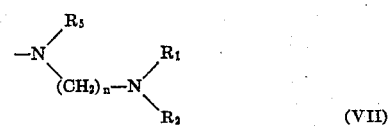

in which $R_5$ is a hydrogen atom, or a straight or branched alkyl radical of one to four carbon atoms, and $R_1$, $R_2$ and $n$ are as hereinbefore defined; or a cyano-alkoxy radical of the formula:

-O-(CH$_2$)$_n$-C ≡ N (VIII)

in which $n$ is as hereinbefore defined.

The salts which the componds (I) form optionally, according to the meaning of Z, with pharmaceutically tolerated inorganic or organic acids or bases also form part of the invention.

The invention also comprises a process for the preparation of the compounds (I) in which Z = OM or OR, according to which a diphenol of the general formula (IX), preferably in the form of an alkali phenate

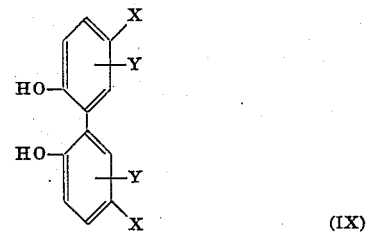

in which X and Y have the same meanings as in the general formula (I) above, is reacted, in a suitable solvent, either with a dihalo-acetic acid, in the form of one of its alkali salts, or with an alkyl dihalo-acetate, and preferably ethyl dichloro-acetate.

The salts of the diphenol (IX) and those of the dihalo-acetic acid required for the reaction can be prepared in situ by adding to them a base, such as, for example, potassium hydroxide or potassium carbonate, sodium hydroxide or sodium carbonate, lithium hydroxide or lithium carbonate or calcium hydroxide, or, if non-aqueous solvents are used, bases such as alkali hydrides, alkali amides or alkali alcoholates.

When a dihalo-acetic acid is used, it is preferable to carry out the reaction in an aqueous medium. The compounds (I) in which Z = OM (M being an alkali metal) are thus obtained in the form of an aqueous solution. The latter is acidified if it is desired to isolate the corresponding acid (M = H).

When an ester of a dihalo-acetic acid is used, it is preferable to work in a non-aqueous medium, for example in an aromatic hydrocarbon such as benzene, toluene or xylene and the like, or, preferably, in an amide such as dimethylformamide, dimethylacetamide and the like. The compounds (I) in which Z = OR are thus obtained.

The reaction is carried out at a temperature of between 100° and 200°, and preferably at about 120°.

The duration of the reaction can vary from a few hours to several days, the preferred duration of the reaction being 15 hours.

A variant of the process according to the invention, which makes it possible to obtain the compounds (I) in which Z = OH, consists of saponifying, in an acid or alkaline medium, the corresponding compound in which Z is an alkyl radical.

The alkyl, alkoxy-alkyl, amino-alkyl, amino-alkoxy-alkyl and cyano-alkyl esters, the amides and the amino-amides of the general formula (I) are prepared from the corresponding acids (I), using conventional methods for producing these various derivatives.

The salts which the compounds (I) form optionally, according to the meaning of Z, with any pharmaceutically tolerated inorganic or organic acid or base are also prepared by known methods.

The invention finally comprises the industrial uses and more particularly the pharmaceutical uses of the compounds (I). The latter possess pharmacological properties which make them valuable in therapy because they all have the property of liberating, in the living organism of Mammals, dibenzo[$d,f$]dioxepine-[1,3]-6-carboxylic acid from which they are derived and which possesses a powerful hypolipaemia-inducing activity, which has an effect more particularly on the plasma content of cholesterol, phospholipids and triglycerides. This property manifests itself in the normal animal and in the animal in which the level of lipids in the blood is abnormally high.

By way of example, the results of an experiment carried out on 80 Sherman rats, of the male sex, weighing 250 to 300 g and having a normal cholesterolaemia, are given below. These animals are divided by drawing lots into eight batches of 10 animals.

The batches number 1, 2, 3 and 4 are treated orally, over the course of six consecutive days, with respectively 8.75; 17.50; 35 and 70 mg/kg of 2,10-dichloro-dibenzo[$d,f$] dioxepine-[1,3]-6-carboxylic acid, which will be denoted hereafter as "compound A."

The batches number 5, 6, 7 and 8 are treated orally over the course of six consecutive days, with respectively 150, 240, 350 and 500 mg/kg of clofibrate or ethyl parachlorophenoxy-isobutyrate (compound R).

At the beginning and at the end of the treatment, the cholesterolaemia is measured and the percentage reduction of the initial cholesterolaemia is calculated for each animal and for each batch. The dose-effect curve for the compounds A and R can thus be constructed and the 50 percent effective dose, that is to say the dose which reduces the initial cholesterolaemia by 50 percent, can be calculated for each of them. The results are given in the table below.

| Compound | Dose (mg/kg) | Average percentage reduction | ED 50 |
|---|---|---|---|
| A | 8.75 | 19 | |
| | 17.5 | 25 | 49 mg/kg |
| | 35.0 | 47 | |
| | 70.0 | 52 | |
| R | 150 | 37 | |
| | 240 | 38 | 325 mg/kg |
| | 350 | 47 | |
| | 500 | 40 | |

Thus the ratio of the two 50 per cent effective doses (between 6 and 7) shows that the compound A of the invention is six to seven times more active than clofibrate, which is generally considered as the hypocholesterolaemia-inducing reference compound.

Other experiments, carried out by means of the following compounds:
Ethyl 2,10-dichloro-dibenzo[$d,f$]dioxepine-[1,3]-6-carboxylate, or "compound B,"
2,4,8,10-tetrachloro-dibenzo[$d,f$]dioxepine-[1,3]-6-carboxylic acid or "compound C,"
ethyl 2,4,8,10-tetrachloro-dibenzo[$d,f$]dioxepine-[1,3]-6-carboxylate or "compound D"
have shown that these compounds, when administered at a dose of 35 mg/kg for six consecutive days, cause in rats of normal initial cholesterolaemia a lowering of the cholesterolaemia, the extent of which is shown in the table below.

| Compounds | Percentage reduction in cholesterolaemia |
|---|---|
| B | 36 |
| C | 30 |
| D | 24 |

Other experiments, during which the action of the compound A (35 mg/kg) and of clofibrate or compound R (35 and 250 mg/kg) on the content of triglycerides or of phospholipids in the plasma after oral administration for 6 consecutive days where compared, gave the following results:

| Dose (mg/kg) | Compounds | Phospholipids (per thousand) | Triglycerides (per thousand) |
|---|---|---|---|
| 35 | A | 0.65 | 1.30 |
| 35 | R | 0.96 | 2.40 |
| 250 | R | 0.69 | 1.46 |
| — | — | 1.03 | 2.60 |
| (comparison batch) | (comparison batch) | | |

The compounds of the invention possess a very favourable therapeutic index because of their high activity and a relatively low toxicity. For example, the 50 per cent lethal dose of the compound A, ingested by Swiss Mice, amounts to 1,150 (95 per cent confidence limits: 920 – 1,450 mg/kg) whilst that of clofibrate (compound R) is equal to 1,320 (1,170 – 1,490) mg/kg.

Since the difference between the LD 50 of the compounds A and R is not statistically significant and since the compound A is six to seven times more active in inducing hypocholesterolaemia than the compound R, it is deduced that the therapeutic index of A is six to seven times more favourable than that of R.

The therapeutic applications of the compounds (I) comprise principally their use in the treatment of the pathological conditions which are accompanied by hyperlipaemia and more particularly by hypercholesterolaemia, that is to say:

in atheroma in its various forms such as coronary or cerebral circulatory disorders, arterites and arterial hypertension; in primitve hyperlipaemiae; and in essential hypercholesterolaemiae.

As a result, the invention comprises many pharmaceutical compositions containing, as the active principle, one of the compounds (I), optionally in the form of a salt, combined with any excipient which is appropriate to the oral administration of the said compounds.

These pharmaceutical compositions can also contain other medicamentous substances with which the compounds (I) or their salts are therapeutically and pharmaceutically compatible.

For oral administration, any pharmaceutical form appropriate to this method (tablets, dragees, gels, syrup, emulsions and the like) is used, it being possible for a single dose to vary, according to the compound (I) chosen, between 10 and 200 mg and for the daily dose to vary between 30 and 1,000 mg.

The following examples illustrate the invention without implying any limitation with regard to its general scope.

EXAMPLE 1

Ethyl 2,10-dichloro-dibenzo[d,f]dioxepine-[1,3]-6-carboxylate.

A solution of 52 g (204 mmol/g) of 5,5'-dichloro-2,2'-diphenol in 310 ml of dimethylformamide and 15.2 g (204 mmol/g) of lithium carbonate is introduced into a 1 litre three-necked flask, equipped with a mechanical stirrer, a reflux condenser and a dropping funnel. This solution is stirred whilst heating it at 120° for 75 minutes. 64 g (408 mmol/g) of ethyl dichloroacetate are then added, via the dropping funnel, over the course of 30 minutes, and this mixture is heated, whilst stirring it, for 15 hours at 120°. The mixture is left to cool, is poured into 3 litres of water and is extracted with three times 400 ml of ether. The ether extracts are combined and washed twice successively with 500 ml of N sodium hydroxide solution and then once with 500 ml of water; the organic phase is dried over sodium sulphate and filtered and the ether is driven off from the filtrate in vacuo on a water bath. The oily residue is triturated in 35°–70° petroleum ether until it crystallises; ethyl 2,10-dichloro-dibenzo[d,f]dioxepine-[1,3]-6-carboxylate is filtered off and recrystallised from isopropyl ether. Yield = 15 percent. Melting Point = 90°.

| Analysis $C_{16}H_{12}Cl_2O_4$ | (339) | | |
|---|---|---|---|
| Calculated %: | C 56.66 | H 3.57 | Cl 20.91 |
| Found %: | 56.50 | 3.75 | 20.70 |
| | 56.67 | 3.67 | 20.83 |

EXAMPLE 2

Ethyl 2,4,8,10-tetrachloro-dibenzo[d,f]dioxepine-[1,3]-6-carboxylate.

A solution of 25 g (77 mmol/g) of 3,3',5,5'-tetrachloro-2,2'-diphenol in 16 ml of anhydrous dimethylformamide is introduced into a 500 ml three-necked flask, equipped with a mechanical stirrer, a reflux condenser and a dropping funnel, and 6 g (77 mmol/g) of lithium carbonate are added. This mixture is heated for 1 hour at 100°, whilst stirring, and then 22.6 g (154 mmol/g) of ethyl dichloro-acetate are added, drop by drop, over the course of 1 hour. The reaction mixture is heated for 12 hours at 100°, is left to cool and is then poured into 2 litres of water. The mixture is extracted three times successively with 500 ml of ether; the ether extracts are combined, washed with 500 ml of N sodium hydroxide solution and then with 500 ml of water and dried over sodium sulphate; the solution is filtered, the ether is driven off from the filtrate in vacuo on a water bath and the residue is crystallised from isopropyl ether. 8 g (yield = 25 percent) of ethyl 2,4,8,10-tetrachloro-dibenzo[d,f]dioxepine-[1,3]-6-carboxylate which, after recrystallisation from ethyl acetate, melts at 152°, are thus obtained.

| Analysis $C_{16}H_{10}Cl_4O_4$ | (408) | | |
|---|---|---|---|
| Calculated %: | C 47.09 | H 2.47 | Cl 34.75 |
| Found %: | 47.17 | 2.34 | 34.13 |
| | 46.97 | 2.35 | 34.42 |

EXAMPLE 3

2,10-Dichloro-dibenzo[d,f]dioxepine-[1,3]-6-carboxylic acid.

5 ml of 10 percent strength sodium hydroxide solution are added to a suspension of 4.3 g (12.7 mmol/g) of ethyl 2,10-dichloro-dibenzo[d,f]dioxepine-[1,3]-6-carboxylate in 5 ml of alcohol and this mixture is heated, whilst stirring, for 2½ hours at the reflux temperature. The reaction mixture is left to cool and is poured into 400 ml of water; it is extracted with 50 ml of ether and then acidified with concentrated hydrochloric acid to pH 1 and extracted with three times 150 ml of ether. The ether dichloro-dibenzo[d,f]dioxepine-[1,3]-6-carboxylate in 5 ml of alcohol and this mixture is heated, whilst stirring, for 2½ hours at the reflux temperature. The reaction mixture is left to cool and is poured into 400 ml of water; it is extracted with 50 ml of ether and then acidified with concentrated hydrochloric acid to pH 1 and extracted with three times 150 ml of ether. The ether extracts are combined, dried over sodium sulphate and filtered; the ether is driven off from the solvent in vacuo on a water bath and the residue is crystallised from 35°–70° petroleum ether. 3.6 g (yield = 92 percent) of 2,10-dichloro-dibenzo[d,f]dioxepine-[1,3]-6-carboxylic acid which, after recrystallisation from a 4/1 chloroform/hexane mixture, melts at 190°–191°, are thus obtained.

| Analysis $C_{14}H_8Cl_2O_4$ | (311) | | |
|---|---|---|---|
| Calculated %: | C 54.05 | H 2.59 | Cl 22.79 |
| Found %: | 54.27 | 2.51 | 22.83 |
| | 54.14 | 2.50 | 22.54 |

EXAMPLE 4

2,4,8,10-Tetrachloro-dibenzo[d,f]dioxepine-[1,3]-6-carboxylic acid.

50 ml of N sodium hydroxide solution are added to a solution of 19.5 g (48 mmol/g) of ethyl 2,4,8,10-tetrachloro-dibenzo[d,f]dioxepine-[1,3]-6-carboxylate in 50 ml of alcohol and this mixture is heated for 6 hours at the reflux temperature. The alcohol is driven off in vacuo on a water bath, and the residue is poured into 1 litre of water and is extracted with 500 ml of ether. The mixture is acidified to pH 1 with concentrated hydrochloric acid and is re-extracted twice with 250 ml of ether each time; the ether extracts are combined, dried over sodium sulphate and filtered; the ether is driven off from the filtrate in vacuo on a water bath and the residue is crystallised from isopropyl ether. 17.3 g (yield = 96 percent) of 2,4,8,10-tetrachloro-dibenzo[d,f]dioxepine-[1,3]-6-carboxylic acid which, after recrystallisation from ethyl acetate, melts at 240°, are thus obtained.

| Analysis $C_{14}H_6Cl_4O_4$ Calculated %: | (380) C 44.25 | H 1.59 | Cl 37.32 |
|---|---|---|---|
| Found %: | 44.40 | 1.23 | 37.23 |
|  | 44.24 | 1.29 | 37.16 |

We claim:
1. A compound of the formula:

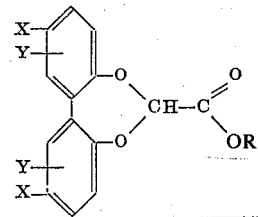

in which X is halogen; Y is hydrogen or halogen, and R is hydrogen or a straight or branched alkyl radical of one to four carbon atoms, and the pharmaceutically acceptable salts thereof wherein the halogen is selected from the group consisting of chlorine and bromine.

2. A compound of claim 1 wherein X is chlorine.

3. A compound according to claim 1 which is ethyl 2,10-dichloro-dibenzo[d,f]dioxepine-[1,3]-6-carboxylate.

4. A compound according to claim 1 which is ethyl 2,4,8,10-tetrachloro-dibenzo[d,f]dioxepine-[1,3]-6-carboxylate.

5. A compound according to claim 1 which is 2,10-dichloro-dibenzo[d,f]dioxepine-[1,3]-6-carboxylic acid or a pharmaceutically acceptable non-toxic salt thereof.

6. A compound according to claim 1 which is 2,4,8,10-tetrachloro-dibenzo[d,f]dioxepine-[1,3]-6-carboxylic acid or a pharmaceutically acceptable non-toxic salt thereof.

* * * * *